A. SECHRIST.
COMBINED PAN HANDLE AND PAN SUPPORT.
APPLICATION FILED OCT. 22, 1920.
1,395,301. Patented Nov. 1, 1921.
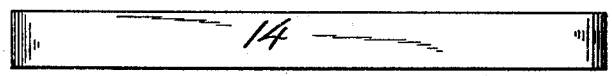
Fig. 1.
Fig. 2.
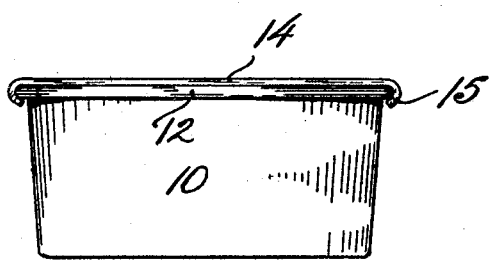
Fig. 3.
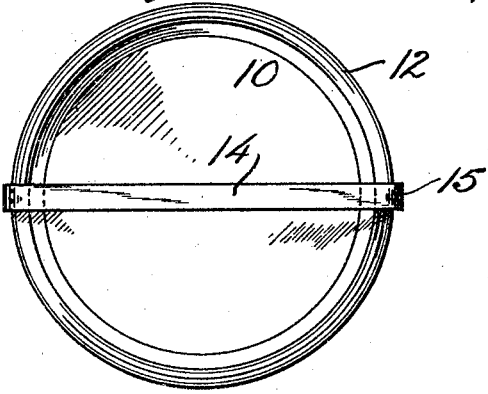
Fig. 4.
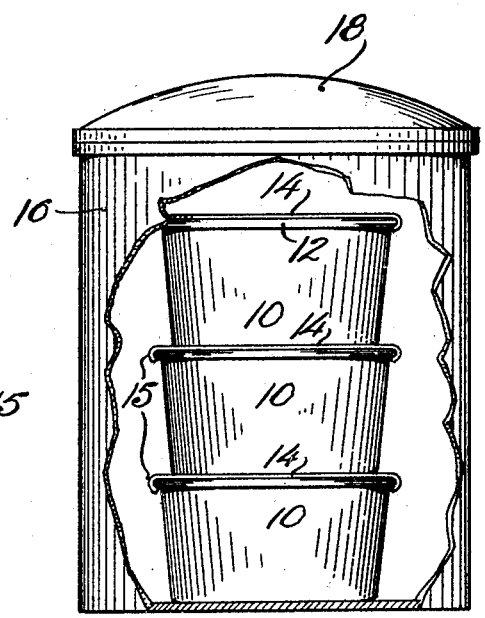
Fig. 5.
Inventor
Albert Sechrist.
By
Attorney

UNITED STATES PATENT OFFICE.

ALBERT SECHRIST, OF DENVER, COLORADO.

COMBINED PAN-HANDLE AND PAN-SUPPORT.

1,395,301.

Specification of Letters Patent.   Patented Nov. 1, 1921.

Application filed October 22, 1920. Serial No. 418,796.

*To all whom it may concern:*

Be it known that I, ALBERT SECHRIST, a citizen of United States, residing at 1717 Logan street, the city and county of Denver and State of Colorado, have invented certain new and useful Improvements in Combined Pan-Handles and Pan-Supports; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide simple means for supporting one pan upon another within a cooking vessel, the means on each pan also serving as a handle therefor.

In the drawings, which form a part of this specification:

Figure 1 is a face view of the device;

Fig. 2 is a side elevation;

Fig. 3 is an elevation, showing the device applied to a pan;

Fig. 4 is a plan of a pan with the device thereon; and

Fig. 5 is a view showing the use of a plurality of the devices in a cooking vessel.

The handle and support comprise an elongated flat bar 14, whose ends are curved under and inward to provide hooks 15 which are adapted to engage the rim 12 formed upon the upper edge of a pan 10. The hooks 15 preferably snugly engage the rim 12, so that the bar 14 will not be accidentally displaced; thus the bar will serve as a handle for the pan. In order to remove the bar it is necessary merely to move one end of the bar laterally to disengage the respective hook 15. As shown in the drawings, a plurality of devices are used in connection with several pans 10 which are arranged one above another within a cooking vessel 16, such as a pressure cooker which has a lid 18. The type of pan 10 which is used has its top of greater diameter than its bottom, so that there is ample space around the bottom of each pan for the circulation of steam in the pans. With this construction of pan, the bar 14 on one pan serves as a support for the pan above, in addition to its function as a handle for the respective pan.

From the foregoing it will be seen that I have provided a simple, efficient device having the combined function of a handle for one pan and a support for a pan thereabove.

I claim:

In combination a plurality of superimposed pans, a lower pan having a rim around the upper edge thereof and having a greater diameter than the bottom of the pan thereabove, and means for supporting the upper pan on the lower, said means comprising a bar secured to the upper edge of the lower pan and having its ends turned under and inward to produce hooks engaging the rim of the lower pan, the upper pan resting on said bar, said bar being adapted to serve as a handle.

In testimony whereof I affix my signature.

ALBERT SECHRIST.